United States Patent
Zypman Niechonski et al.

[11] Patent Number: 6,145,374
[45] Date of Patent: Nov. 14, 2000

[54] SCANNING FORCE MICROSCOPE WITH HIGH-FREQUENCY CANTILEVER

[76] Inventors: Fredy Ruben Zypman Niechonski, P.O. Box 2875, Juncos, Puerto Rico 00777-2781; Steven Joseph Eppell, 2981 Berkshire Rd., Cleveland Hts., Ohio 44118

[21] Appl. No.: 09/075,007

[22] Filed: May 9, 1998

[51] Int. Cl.$^7$ ..................................................... G01B 5/28
[52] U.S. Cl. .......................................................... 73/105
[58] Field of Search .............................. 73/105; 250/306, 250/307

[56] References Cited

U.S. PATENT DOCUMENTS

| | | | |
|---|---|---|---|
| 5,224,376 | 7/1993 | Elings et al. | 73/105 |
| 5,440,121 | 8/1995 | Yasutake et al. | |
| 5,477,732 | 12/1995 | Yasue et al. | 73/105 |
| 5,714,756 | 2/1998 | Smith et al. | |
| 5,806,978 | 9/1998 | Abraham et al. | |
| 5,847,383 | 12/1998 | Tong et al. | 250/306 X |

FOREIGN PATENT DOCUMENTS 684 595  11/1995  European Pat. Off. .

OTHER PUBLICATIONS

EPO Abstract of JP 06–147882 A (Ricoh Co. Ltd.), May 27, 1994.
EPO Abstract of JP 08–129018 A (Nissin Electric Co., Ltd.), May 21, 1996.
EPO Abstract of JP 09–269330 A (Olympus Optical Co., Ltd.), Oct. 14, 1997.
EPO Abstract of JP 06–323843 A (Seiko Inst. Inc.), Nov. 25, 1994.
EPO Abstract of JP 11–030620 A (Seiko Inst. Inc.), Feb. 2, 1999.

*Primary Examiner*—Daniel S. Larkin
*Attorney, Agent, or Firm*—Finnegan, Henderson, Farabow, Garrett & Dunner, L.L.P.

[57] ABSTRACT

An apparatus and a process for determining resonant frequencies for a cantilever used to measure tip-to-sample distances on a scanning force microscope. The process uses a non-linear equation and does not require knowledge of the shape of the cantilever to obtain the measured forces. As the tip-to-sample distance varies, the resonant frequency of the cantilever changes. Instead of measuring the positions of the tip and sample and the spring constant (k) of the cantilever, the present invention measures the resonant frequency at each data point. The shifts in frequencies contain the information necessary to reconstruct the force-distance curve.

20 Claims, 2 Drawing Sheets

SCANNING FORCE MICROSCOPE WITH HIGH-FREQUENCY CANTILEVER

BACKGROUND OF THE INVENTION

1. Field of the Invention

The present invention relates to a scanning force microscope used for studying surface properties of materials on size scales ranging from the atomic to the micron level.

2. Background of the Prior Art

Scanning force microscopes (SFM) are known for their use in a broad range of fields where high resolution information regarding the surface region of a sample is desired. A certain subset of SFMs utilizes a flexible cantilever attached to a small probe. FIG. 1 shows the basic components of such an SFM. A cantilever-tip assembly 14, 15, 16 is used in conjunction with a scanning system 10, 11, 12, 13, 18, 19, 20, 21 to probe a surface 17. The tip 16 may either contact the sample or may sense the sample without direct contact. Knowledge of the position of the tip 16 is required in all modes of operation of the machine. This position is usually obtained by measuring the angular deflection of the cantilever 15 to which the tip 16 is attached. The cantilever-tip assembly is commonly modeled as a mechanical simple harmonic oscillator (SHO).

SFM, also known as Atomic force microscopes (AFM), probe the surface of a sample with a sharp tip. The tip is located at the free end of a cantilever. The length of the cantilever is generally less than 300 μm. Forces between the tip and the sample surface cause the cantilever to bend, or deflect. A detector measures the cantilever deflection as the tip is scanned over the sample, or the sample is scanned under the tip. The measured cantilever deflections can be used to generate isoforce contours. Simplifying assumptions are often used to convert these isoforce curves into putative topographs of the surface. SFMs can be used to study solids and liquids, which may be insulators, semiconductors, or electrical conductors.

In addition to imaging, SFMs are used to measure forces of interaction between the probe tip and the surface. This is accomplished by performing a force-distance experiment. An SFM found in the prior art involves measurement of the position of the tip, the position of the sample, and a single value (k, the spring constant). The spring constant is then used to convert the tip and sample position information into forces.

The forces that contribute to the deflection of the SFM cantilever can be divided into two categories: repulsive and attractive. The dominant repulsive force at very short range (tip-to-sample separation <0.3 nm) is the hard core repulsive force. At large separations, the tip-sample force arises from a number of physical phenomena such as electrostatics, magneto-statics, surface tension, and adhesion. One of these longer-range force terms relevant to all SPMs belongs to the electrostatics group and is commonly referred to as the van der Waals force. This force arises due to fluctuating dipoles in the tip and the sample. The dependence of the total force, which includes the van der Waals force upon the distance between the tip and the sample, is shown in FIG. 2. Two regions are labeled in FIG. 2, the contact region and the non-contact region. In the contact region, the cantilever is held less than a few tenths of a nano-meter from the sample surface, and the total inter-atomic force between the cantilever and the sample is repulsive. In the non-contact region, the cantilever is held on the order of one to ten nano-meters from the sample surface, and the inter-atomic force between the cantilever and the sample can be either attractive or repulsive.

When used as imaging tools, SPMs operate in one of two modes: variable tip position or constant tip position. In the variable mode, forces between tip and sample are allowed to alter the Z position of the tip (example: a repulsive force may push the tip up, an attractive force may pull the tip down). The point at which the tip probes the sample surface is raster scanned (this defines and X-Y plane) while the position of the tip (along the Z direction) is recorded. In this manner, a series of (x,y,z) triplets are obtained. The set of all these triplets make up the variable mode image. In the constant mode, the Z position of the tip is maintained fixed during the raster scan. Often, this is accomplished by varying the Z position of the sample during the raster scan. In this mode, the Z portion of the (x,y,z) triplet is obtained by measuring the distance the sample moves in order to maintain a constant tip position.

Cantilever based SFMs utilize three distinct sub-modes of operation which can be performed in either constant or variable mode. These sub-modes are contact, intermittent contact, and non-contact. In contact-SFM, also known as repulsive-SFM, the probe tip makes physical contact with the sample (i.e. the tip is brought close enough to the sample surface so that the dominant repulsive force is the hard core force). The tip is attached to the free end of a cantilever with a spring constant lower than the effective spring constant holding the atoms of the sample together. As the scanner gently traces the tip across the sample (or the sample under the tip), the contact force causes the cantilever to bend to accommodate changes in topography. The Z position of the cantilever is typically measured using optical techniques. The most common method involves the use of an optic lever. A laser beam is reflected off the back of the cantilever 15 and onto a position-sensitive photo-detector (PSPD) 13 as shown in FIG. 1. As the cantilever bends, the position of the laser beam on the detector shifts. The actual quantity measured is the angle through which the cantilever bends. It is common to make an approximation that any change in this angle is equal to the change in the Z-displacement of the free end of the cantilever. Other methods to detect the cantilever deflection are known. These include optical interference, a tunneling microscope, and the use of a cantilever fabricated from a piezo-electric material.

An SFM can also be operated in a mode where the tip is not in direct contact with the sample surface (i.e. the dominant repulsive force is not the hard core repulsion). Conceptually, the simplest method utilizing non-contact mode involves placing the tip far enough above the surface so that the force generated by the cantilever at its equilibrium deflection is sufficient to counter the sum of all attractive forces. The tip-sample separation (usually a few nano-meters) must be small enough so that the force field generated by the sample is sufficient to measurably deflect the cantilever. This spacing is indicated on the van der Waals curve of FIG. 2 as the non-contact region. The sample is then raster scanned below the tip and the tip displacement is recorded as in the variable contact mode technique. Prior art shows this to be the only non-contact mode to work in fluid. It is difficult to implement. A more common non-contact technique involves oscillating the cantilever near its resonant frequency. The tip sample distance it then reduced until the existence of tip-sample forces causes a shift in the resonant frequency of the cantilever. Rarely is the actual frequency shift measured. Usually, either the amplitude of vibration at the original resonant frequency is measured or the shift in phase between the driving signal and the cantilever oscillation is measured. A major shortcoming of the oscillating non-contact mode is that it does not provide the kind of high lateral resolution obtained in contact mode. Generally, lateral resolution around 10 nano-meters is obtained. NC-SFM is desirable because it provides a means for measuring sample topography with no contact between the tip and the sample and thus renders minimal damage to the sample. It is also desirable because it permits the use of extremely high signal to noise ratio instrumentation (i.e. lock-in amplification) to be used in detecting the effect of sample forces on tip position. These techniques involve measuring averages of the cantilever motion. Thus, it is desirable to have the highest possible resonant frequency so that physically meaningful averages can be taken at reasonable raster scanning rates. Typically, cantilevers with spring constants around 100 N/m having resonant frequencies in the range of 300–600 kHz are utilized. Like contact SFM, non-contact SFM can be used to measure the topography of insulators and semiconductors as well as electrical conductors. The total force between the tip and the sample in the non-contact region is very low, generally about $10^{-12}$N. This low force is advantageous for studying soft or elastic samples. A further advantage is that samples like silicon wafers are not contaminated through contact with the tip, a very advantageous characteristic for the microelectronics industry.

Intermittent contact mode is a hybrid of the contact and non-contact modes. In this mode, the cantilever is also made to oscillate near its resonant frequency. The amplitude of oscillation is typically tens to hundreds of nano-meters. A tip-sample separation is chosen so that, at the bottom of its stroke, the probe tip comes into direct contact with the sample surface. Prior art does not describe in detail how the physical interaction between the tip and sample generates the signal measured in intermittent contact mode. In general, it can be said that some combination of the long range force of interaction and the hard core repulsion experienced at the bottom of each stroke conspire to alter the vibrational amplitude of the cantilever. Usually, this change is toward smaller amplitudes. When operated in air, intermittent contact mode is usually performed with a stiff cantilever like that used in non-contact mode. A major benefit of intermittent contact mode is that it works well in fluid. When performed in fluid, lower resonant frequency cantilevers are used (10–100 kHz) to prevent viscous damping forces from extinguishing the signal. A major advantage of intermittent contact mode is that it routinely provides very high lateral resolution (almost as high as contact mode) but does not present high shear forces in the XY plane. This permits imaging of delicate samples that are easily pushed around on the surface (example: cell membranes and adsorbed molecules).

The relationship between the motion of a cantilever and variations in sample topography can be explained as follows within the SHO model approximation. The cantilever is modeled as an oscillator having a resonant frequency that varies as the square root of its spring constant. In addition, the spring constant of the model oscillator varies with the force gradient experienced by the cantilever. Finally, the force gradient, which is the derivative of the force versus distance curve shown in FIG. 2, changes with tip-to-sample separation. Thus, changes in the resonant frequency of the cantilever can be used as a measure of changes in the force gradient, which reflect changes in the tip-to-sample spacing, or sample topography, and/or chemical nature. Prior art does not utilize the change in the model oscillator's spring constant when calculating cantilever force. Instead, it always utilizes the free space oscillator spring constant measured when the tip-sample separation is large enough so that the force field generated by the sample is not measurable by the instrument.

In prior art devices, the cantilever-tip assembly is modeled as a mechanical simple harmonic oscillator (SHO). Systems properly described by these models can not naturally vibrate at more than one frequency. In reality, multiple vibrational frequencies are excited during standard SFM operation. More than one frequency is present in the system precluding generalized application of the SHO theory. Thus, it is not appropriate to obtain forces from measured displacements of an SFM cantilever using Hooke's Law ($F=-k\Delta z$) unless it is known a priori that the system contains no vibrations above the first resonance. Using the linear equation ($F=-k\Delta z$) does not allow for more than one frequency. As the cantilever approaches the snap-to-contact point in the SHO model, the lowest frequency mode is lost. In reality, as the cantilever approaches the sample, and once it is beyond the snap-to-contact point (the tip-sample separation where the attractive force gradient exceeds the spring constant obtained using the SHO model) the cantilever cannot be excited in the lowest mode. In the SHO model—which uses a single mass and thus uses a single degree of freedom—measurement at and beyond the snap-to-contact point is pointless because no second frequency is available. Thus, true force-distance curves can not be obtained by simply multiplying measured cantilever displacements by some previously determined spring constant.

The problem with the prior art devices is that the cantilever is considered to be a simple harmonic oscillator (SHO), thereby limiting the speed with which data can be meaningfully collected from these machines. As an SHO, the system uses Hooke's law where $F=-kx$, to convert cantilever displacement measurements to tip-sample force values. The value of k is measured, the cantilever deflection is measured, and thus the force can be evaluated. The prior art devices can be used to make measurements of the surface at frequencies less than the lowest resonant mode of the cantilever. This means that forces between tip and sample during low raster speed topographs in either contact mode or the non-oscillating non-contact mode are well modeled using the prior art. In addition, force-distance measurements made at low speed are also well modeled using the prior art. However, high-speed topographs as well as force-distance measurements taken at high speed are not well modeled using the prior art. As the cantilever approaches the snap-to-contact point, one mode of vibration is lost using the SHO methods. In reality, as the tip approaches the sample, the cantilever is excited into higher modes. Since the SHO methods use a single mass having a single degree of freedom and therefore use of a single mode of vibration, these methods cannot yield accurate measurements. Beyond the snap-to-contact point, the distance from tip to sample (z) is well defined, but the value of (k) (the spring constant of the cantilever) is lost. The value of (k) is meaningless at this small distance (z).

Thus, fine static 3-dimensional measurements of topographic surfaces, such as a carbon fiber/polymer composite and a semiconductor, can be made using the SHO methods, but finer topographical measurements or real time measurements of interactions of molecules cannot be done reliably.

Another problem with the prior art devices is that the speed at which the cantilever approaches the sample must be slow enough so that the cantilever does not vibrate above its first mode. When using the Hooke's law approach to determining the force-distance relations, the force acting to flex or bend the cantilever as the tip approaches the sample increases as the distance (d) approaches the sample. The distance (d) to the sample is proportional to the force acting to bend the cantilever. If the speed of motion of the cantilever is above a certain value, then vibrations will be induced in the cantilever, and the measurements of the force will give inaccurate readings of the tip-to-sample distance (d). The prior art method can provide one data point (tip-to-sample distance) each millisecond. Thus, the prior art devices cannot scan a surface topography of an area fast enough for real-time imaging of relatively large objects like a protein. A biological living sample can move many pixels in one second. To have chemical specificity while resolving the motion of such a biological living sample, one needs to get F-distance measurements at each pixel and thus one sees that even for a modest 64×64×64 point's image, the frequency of the cantilever must be larger than $10^5$ voxels/sec. Under those conditions, motion containing frequencies larger than the lowest natural frequency will be excited.

The primary object of the present invention is to obtain accurate force measurements using an SPM. The specific situations in which this accuracy is desired are twofold. First, when the tip-sample separation is very small (within the snap-to-contact region). Second, when high data collection rates are desired as in high-speed imaging and/or high speed force-distance measurements.

SUMMARY OF THE INVENTION

The objectives of the present invention are accomplished by the use of a non-linear equation to determine the resonant frequencies for the cantilever used to measure the tip-to-sample distance in the prior art devices. The method of the present invention does not require exact knowledge of the shape of the cantilever in order to obtain measured forces. Thus, the method of the present invention allows the use of existing SFM technology. It can measure deflection at only one point, and still obtain information contained in any mode of oscillation. Instead of needing to find many spring constants, the present invention needs only input a material constant for the cantilever (E), its length (L), and its area moment of inertia (I). The method of the present invention includes: positioning the cantilever at a distance (d) above a sample; exciting the natural vibrations into the cantilever (by means of piezoelectric driving, a well known technology); measuring the value of position (d); measuring the deflection (around d) versus time at one position (typically the free end, to enhance sensitivity) on the cantilever; taking the Fast Fourier Transform to obtain resonance frequency spectrum; finding the slope (G); repeating the process for another distance (d); plotting the slope (G) versus distance (d) relations; and integrating the curve of (G) versus (d) to get the Force-versus-Distance curve.

DETAILED DESCRIPTION

Figure 1:
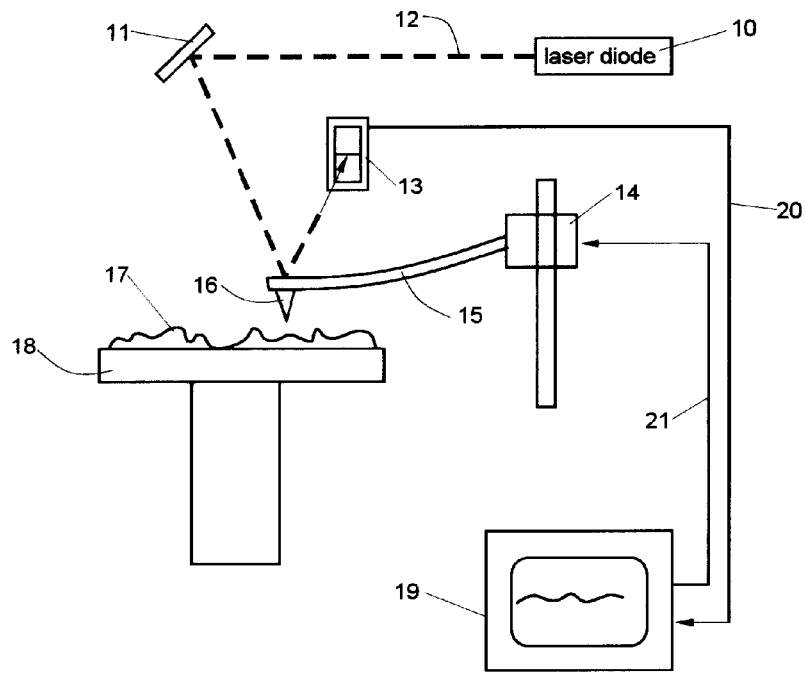
FIG. 1 shows a scanning force microscope of the prior art.

As the tip-to-sample distance varies, the resonant frequency of the cantilever changes. Instead of measuring the positions of the tip and sample and the spring constant (k), the present invention measures the resonant frequency at each data point. The mode chosen must be higher than the first resonance frequency if one desires to obtain information during the snap-to-contact point. However, the invention allows for the study of all, the lowest frequency mode and the higher frequency modes, at once. The shifts in frequencies contain the information necessary to reconstruct the force-distance curve.

The process comprises the following steps:
1. Positioning the tip of the cantilever at a distance (d) above the sample;
2. Exciting the natural vibrational modes into the cantilever;
3. Measuring the value of the position (d);
4. Measuring the vibration of the free end (around d) versus time (t) at one or more positions on the cantilever;
5. Taking the Fast Fourier Transform (or any other mathematical time-frequency algorithm) to get the resonance frequencies $f_n$, with n=0,1,2,3, . . . where $3 \leq n \leq 10$;
6. Using the equation:

$$f_n = \left\{\frac{EI}{4\pi\rho AL^4}\right\}^{1/2} \xi_n^2, n = 0, 1, 2 \ldots,$$

obtaining the $\xi_n$;

7. Once $\xi_n$ are known, substituting each of the $\xi_n$ into the following equation:

$$\frac{1 + \cos\xi\cosh\xi}{\sin\xi\cosh\xi - \cos\xi\sinh\xi}\xi^3 = \frac{GL^3}{EI};$$

and calculating G, the slope of the force-distance curve;

8. Moving the cantilever to another position (d) above the sample.
9. Repeating the process for another value of (d);
10. Plotting the values of (G) versus (d);
11. Integrating the (G) versus (d) curve to obtain the Force-Distance curve.

Typical SFMs measure the deflection of the cantilever, u(x,t), at one (x) position near the free end of the cantilever. The cantilever is assumed to be rigidly attached at one end so that at x=0 no translation or rotation occurs. At the free end (x=L), the cantilever is loaded with a vertical force (F). (L) is the length of the cantilever. The function, u(x,t), is obtained from the equation:

$$\frac{EI}{\rho A}\frac{\partial^4 u(x,t)}{\partial x^4} + \frac{\partial^2 u(x,t)}{\partial t^2} = 0 \qquad \text{(Equation 1)}$$

(Equation 1) together with the above boundary conditions. In this equation, (E) is the Young's modulus, (A) is the cross sectional area, (I) is the geometric momentum of inertia of this area, and (p) is the linear density. Accounting for the tip-sample force in the boundary conditions maintains a homogeneous differential equation of motion.

Since the vibrations in typical SFM work are small, i.e. u(x,t)/L<<1, the tip probes a small region of the force-distance curve. Thus, it is reasonable to write the tip-sample force as $$F(d,t)=F_s(d)+G(d)\Delta u(L,t), \qquad \text{(Equation 2)}$$

where (d) is the separation between tip and sample, ($F_s$) is the average force, (G) is the slope of the force-distance curve at separation (d), and $\Delta u(L,t)=u(L,t)-u_s(L)$. $u_s(x)$ is the curve which describes the static deflection of the cantilever solicited by $F_s$. The vibration of the cantilever at the free end, $u(L,t)$, is referenced to this static curve.

The form for (F) given above is reasonable only if the average velocity at which the sample approaches the tip is small compared with the instantaneous velocity due to oscillations present in the cantilever. For a flimsy cantilever excited in its lowest resonant frequency, this corresponds to approximately 10 kHz. Typically, one data point is collected each millisecond. The cantilever will oscillate 10 times during this interval. Thus, one can study the motion of the cantilever at a particular tip-sample average separation as if that separation were constant. Therefore, both $(F_s)$ and (G) are slowly varying implicit functions of time as compared with $u(x,t)$. This means that the path traced out by the tip of the cantilever as it approaches the sample surface is the superposition of the conventional force-distance curve and a set of high frequency vibrations, $u(x,t)$, due to resonant oscillations of the cantilever. Since the average velocity at which the sample approaches the tip is less than the instantaneous velocity due to the oscillations present in the cantilever, $\Delta d$ can be substituted for $\Delta u$ in equation 2. Implied in this substitution is a time average of the tip-sample spacing. To obtain the commonly reported force-distance curve, it is necessary to integrate equation 2.

The resonant frequencies for the cantilever under consideration are given by the equation:

$$f_n = \left\{\frac{EI}{4\pi\rho AL^4}\right\}^{1/2} \xi_n^2, n = 0, 1, 2 \ldots,  \qquad \text{(Equation 3)}$$

where $\xi_n$ are the solutions to the equation:

$$\frac{1+\cos\xi\cosh\xi}{\sin\xi\cosh\xi - \cos\xi\sinh\xi}\xi^3 = \frac{GL^3}{EI}. \qquad \text{(Equation 4)}$$

Figure 2:
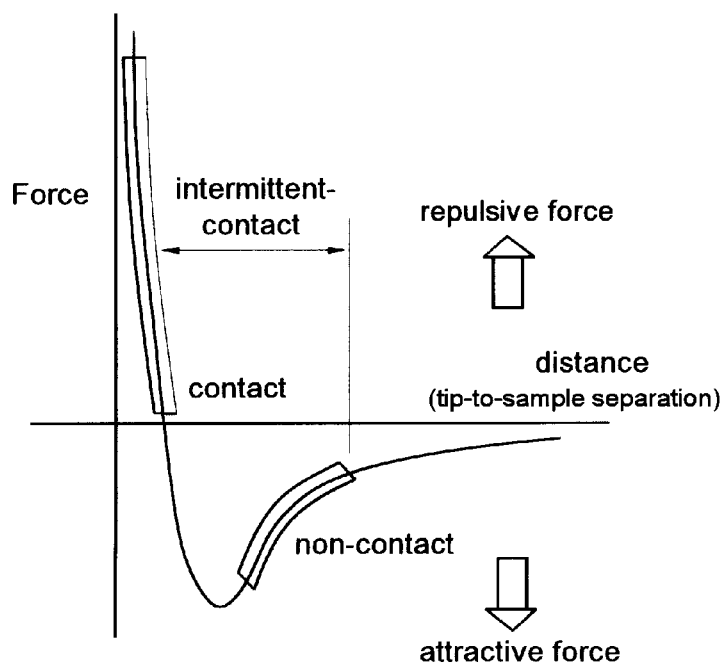
FIG. 2 shows the dependence of the van der Waals force upon the distance between the tip and the sample.
Figure 3:
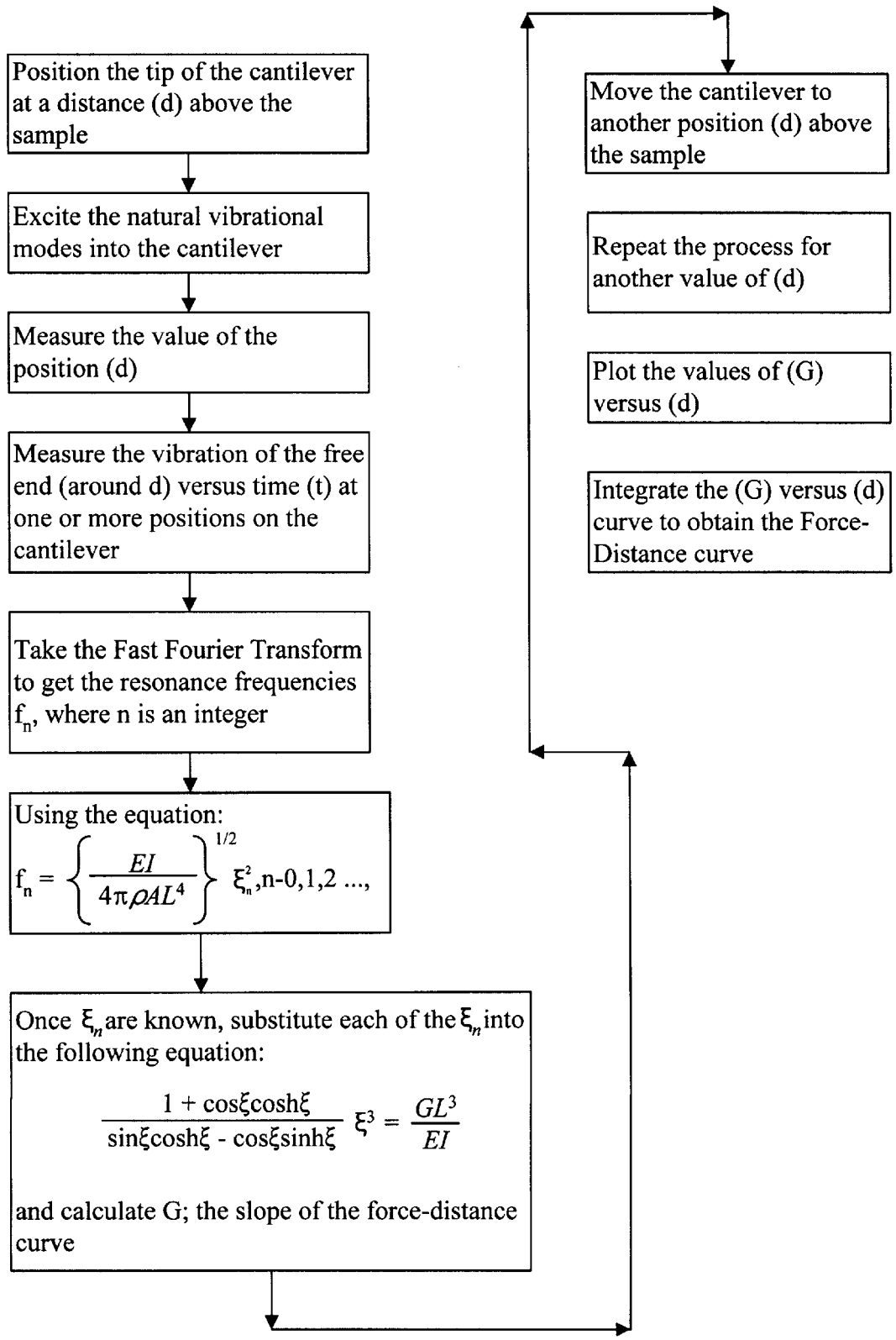
FIG. 3 shows a flow chart of the process of the present invention.

Equations 3 and 4 provide a means to obtain (G) from experimentally measured quantities. One would substitute a measured resonant frequency $(f_n)$ into the left side of equation 3, solve for $\xi_n$, substitute this solution into the left side of equation 4 and solve for (G). This process is repeated several times to give several values of (G) versus (d). A graph of (G) versus (d) can be plotted to get a curve. This curve of the graph of (G) versus (d) is then integrated to obtain the Force versus Distance curve similar to FIG. 2. The value on the left side of equation (4) is independent of (n).

The present invention can be used with a SFM device of the prior art by modifying the software, which is used to determine the deflection distance of the cantilever tip. Thus, the accuracy of a scanning force microscope can be increased without having the change the hardware of the device and data points can be gathered faster. The present invention can also be used in new SFMs.

We claim:

1. A process for measuring a slope (G) of a Force vs Distance curve at a given point of that curve, comprising:
    (a) positioning a cantilever at a distance (d) from a sample;
    (b) exciting the natural vibrational modes into the cantilever and;
    (c) using a non-Hookian equation, solving for a value of the slope (G) of the force vs distance curve from the measured frequencies of the natural modes.

2. The process of claim 1, wherein the non-Hookian equation is a transcendental equation.

3. The process of claim 2, wherein the transcendental equation is a dispersion-relation equation.

4. The process of claim 2, wherein the transcendental equation is:

$$\frac{1+\cos\xi\cosh\xi}{\sin\xi\cosh\xi - \cos\xi\sinh\xi}\xi^3 = \frac{GL^3}{EI}$$

L represents the cantilever's length,

E represents the Young's modulus of the cantilever's material, and

I represents the cantilever's geometric moment of inertia.

5. The process of claim 1, further comprising:
    (d) positioning the cantilever at a different distance $(d_2)$ from the sample;
    (e) exciting the natural vibrational modes into the cantilever at $d_2$;
    (f) using a non-Hookian equation, solving for a value of the slope $(G_2)$ at the distance $d_2$; and
    (g) determining the force F from the values G vs d.

6. The process of claim 1, further comprising:
    (d) positioning the cantilever at a plurality of distances
    (e) determining a value of G for each of the distances (d); and
    (f) obtaining a Force vs distance relationship from the G vs. d relationships obtained in (e).

7. The process of claim 6, wherein the step (f) includes integration of the G vs. d relationship.

8. The process of claim 6, wherein the frequencies of the natural vibrational modes are measured at a plurality of points along the cantilever.

9. The process of claim 1, wherein the frequencies of the natural vibrational modes are measured at the free end of the cantilever.

10. The process of claim 1, wherein the frequencies of the natural vibrational modes are measured at any point along the cantilever.

11. The process of claim 1, wherein the frequencies of the natural vibrational modes are measured at a plurality of points along the cantilever.

12. The process of claim 1, wherein step (b) includes calculating a vibration vs. time relationship and wherein the method further comprises:
    using a Fourier Transformation of the vibration vs time relationship in step (b); and
    obtaining the normal mode frequencies used for step (c).

13. A method of obtaining a Force vs Distance curve representative of a two-object interaction, comprising;
    (a) positioning a tip of a cantilever at a first distance from a sample;
    (b) exciting the natural vibrational modes of the cantilever;
    (c) determining the value of the first distance;
    (d) determining the oscillation of the cantilever at a location along the cantilever;
    (e) determining the corresponding frequencies from step (d);
    (f) determining the slope (G) of the Force vs. Distance curve from a non-Hookian equation;
    (g) moving the cantilever to a second distance from the sample;
    (h) repeating steps (b) through (f) to obtain a second value of G at the second distance;

(i) obtaining the G vs d relationship; and (j) obtaining the value of the Force vs. Distance curve by integration of the G vs. d relationship.

14. The process of claim 13 wherein the non-Hookian equation is a transcendental equation.

15. The process of claim 14 wherein the transcendental equation is a dispersion-relation equation.

16. The process of claim 15, wherein the transcendental equation is:

$$\frac{1+\cos\xi\cosh\xi}{\sin\xi\cosh\xi - \cos\xi\sinh\xi}\xi^3 = \frac{GL^3}{EI}$$

L represents the cantilever's length,

E represents the Young's modulus of the cantilever's material, and

I represents the cantilever's geometric moment of inertia.

17. An apparatus for measuring topography or forces of a sample, comprising:

a surface to support a sample;

a cantilever;

means to change the position of the cantilever with respect to the surface;

control means to position the cantilever with respect to the sample and to determine a position of the cantilever with respect to the sample;

means to determine the natural vibrations of the cantilever; and control means to determine forces acting between the sample and the cantilever using a non-Hookian equation.

18. The apparatus of claim 17, wherein the non-Hookian equation is a transcendental equation.

19. The apparatus of claim 18, wherein the transcendental equation is a dispersion-relation equation.

20. The apparatus of claim 18, wherein the transcendental equation is:

$$\frac{1+\cos\xi\cosh\xi}{\sin\xi\cosh\xi - \cos\xi\sinh\xi}\xi^3 = \frac{GL^3}{EI},$$

G represents the a slope of a Force vs. Distance curve representative of a two obiect interaction at a given point of the curve, L represents the cantilever's length, E represents the Young's modulus of the cantilever's material, and I represents the cantilever's geometric moment of inertia.

* * * * *